May 30, 1961  L. F. LARSEN  2,986,424
LOAD CARRYING VEHICLE
Filed May 26, 1958
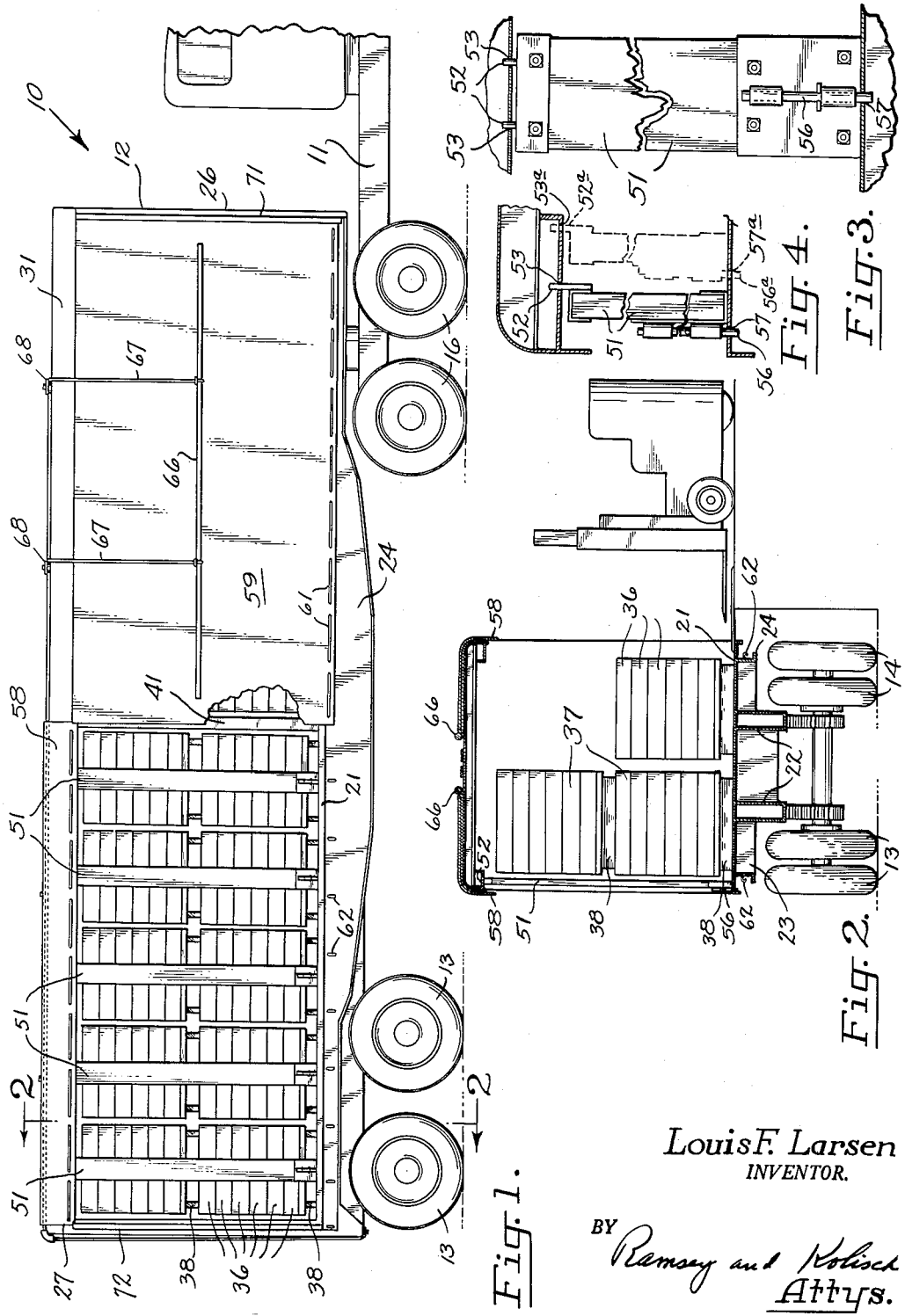
Louis F. Larsen
INVENTOR.
BY Ramsey and Kolisch
Attys.

United States Patent Office 2,986,424
Patented May 30, 1961

2,986,424
LOAD CARRYING VEHICLE
Louis F. Larsen, Portland, Oreg., assignor to St. Johns Motor Express Co., Portland, Oreg., a corporation of Oregon
Filed May 26, 1958, Ser. No. 737,670
4 Claims. (Cl. 296—28)

This invention relates to a vehicle construction, and more particularly to a novel vehicle construction enabling fast loading and unloading of cargo carried thereby.

In handling material such as packages and other articles of regular outline, it is conventional to stack the material on pallets, and move the stacked material from one location to another using fork lift trucks or similar mechanisms. To ship material over long distances, truckers have either stacked loaded pallets as best they could within the interior of a truck moving the pallets through the end opening doors of a truck, or removed the packages from the pallets and stacked them individually within the truck interior. These methods are time consuming, both during unloading and loading of the vehicle. Further, oftentimes the load carrying capacity of a vehicle is not fully utilized.

In general terms this invention contemplates a load carrying vehicle comprising an elongated, flat-bed frame and rigid upstanding end walls affixed to the ends of the frame, one at each end. Joined rigidly to the upper ends of the end walls and spanning the space between the walls is a rigid ceiling. Opposite lateral sides of the vehicle are left open, so that the side edges of the ceiling, end walls, and flat-bed frame define an elongated, rectangular openings on each side of the vehicle. Thus access to the vehicle floor is provided from either side of the vehicle along its length.

The vehicle has detachably mounted along each of its sides a plural number of stake members. Each is separate from the others, and each is secured at one end to the ceiling and the other end to the flat-bed frame. These stake members have finger portions at their ends which seat in receiving wells provided in the frame and ceiling. The support plane of the flat-bed frame is flat, and not marred by the presence of any protrusions projecting upwardly from the frame. Thus when the stakes are removed, articles readily are moved on and off the vehicle.

The stakes are spaced along a side of the vehicle at regular modules related to one of the side-to-side dimensions of the packages to be transported. For instance, glue used as an adhesive in the plywood industry commonly is packaged in rectangular, flat-sided bags of predetermined width. When these bags are transported, the stakes may be spaced apart along a side of the vehicle a distance equal to the width of the bag. A pallet carrying a load of stacked bags thereon is then placed on the vehicle frame with a stake member extending upwardly next to one end of a stack centrally of the sides of the bags of a stack which define its width. The stake member when so positioned relative to the load provides lateral support for the load.

A bulkhead is normally included between the end walls of the vehicle. The bulkhead supports the ceiling, and also divides the vehicle into compartments. Each compartment has a length equal approximately to a whole number multiple of a side-to-side dimension of a package transported. Stacks of packages or bags loaded side-by-side on the vehicle in rows extending along the length of the vehicle thus may be fitted snugly into a compartment, and be supported from shifting longitudinally of the vehicle.

To protect a cargo from water damage, the end walls and ceiling are made solid. Flexible curtains are also provided for covering the open vehicle sides. These curtains are secured along their upper edges to the ceiling of the vehicle, and fasteners mounted at intervals along the length of the flat-bed frame are provided for detachably securing the lower edges of the curtains in place. With a relatively long vehicle, it is best to have each side of the vehicle covered by plural curtains arranged side-by-side, and joined at end edges to the vehicle by slide fasteners, providing air and moisture tight protection rather than to use a continuous one-piece curtain.

Each curtain has a bracing strip mounted therein intermediate the upper and lower edges of the curtain and extending longitudinally of the vehicle. This bracing strip inhibits puffing out of the curtain as a result of the air currents produced by movement of the vehicle.

The bracing strips are also used as part of the means for raising and lowering the curtains. As contemplated herein, pull cords are attached to the curtains in the area of their bracing strips, and these are reeved intermediate their ends over pulleys mounted on the top of the vehicle. When the free ends of the pull cords are pulled away from the pulleys, the bracing strips rise and travel up to and over the top of the ceiling. This moves the curtains free of the vehicle sides, to completely open up the vehicle sides. By using flexible curtains, instead of doors, the vehicle may be driven directly adjacent the loading platform or dock of a warehouse, and both sides opened, without any mechanism swinging out over the platform possibly to be encumbered by the platform structure or articles carried thereon.

A vehicle constructed according to this invention may be loaded or unloaded in a fraction of the time required with conventional vehicles. By utilizing a loading platform so that the level of the platform conforms substantially to the level of the top of the flat-bed frame, a fork lift tractor may be driven onto the vehicle at any point along its length. Maneuvering of the tractor may be kept to a minimum.

These and other objects are attained by this invention, which is described hereinbelow in conjunction with the accompanying drawings wherein:

Fig. 1 is a side elevation showing portions of a tractor-trailer combination, with the trailer constructed according to this invention;

Fig. 2 is a section view along the line 2—2 in Fig. 1, illustrating details of the curtain mechanism, and showing how the trailer may be unloaded at a loading dock;

Fig. 3 is an enlarged view of the ends of a stake member viewing the front side thereof; and Fig. 4 is an enlarged view of the ends of a stake member, viewing one of its side edges.

Referring now to the drawings, 10 indicates generally a tractor-trailer combination having a tractor 11 of conventional design hauling a trailer 12 mounted by a fifth wheel connection to the rear end of the tractor. The rear end of the trailer is mobilely supported by laterally opposed wheel sets 13 and 14. The forward end of the trailer is supported by the rear wheel sets 16 of tractor 11.

Trailer 12 comprises an elongated flat-bed frame 21 supported on longitudinal beam members 22. The upper, support surface of flat-bed frame 21 is substantially planar, without any ridges or protrusions present which would hinder rolling of a tractor onto the frame. Transversely of frame 21 are cross beams 23. Side members 24 extend along the sides of the frame.

Rigidly joined to the forward end of frame 21 is a front end wall 26. In a similar manner rigidly joined to the rear end of frame 21 is a rear end wall 27. These end walls are substantially coextensive in width with the width of frame 21. They are solid, so as to close off the end of the vehicle from wind and rain.

Joined to the upper ends of front and rear end walls 26, 27 and spanning the space between the two is a rigid ceiling 31. Ceiling 31 is also solid, and thereby closes off the top of the vehicle. The vehicle is open sided, with the side edges of frame 21, walls 26, 27, and ceiling 31 defining elongated, rectangular openings on each side of the vehicle.

In the embodiment of the invention illustrated, the vehicle is constructed for the transport of plural packages, represented by rectangular, flat-sided bags 36, such as might be used in packaging glue. These bags are shown in plural stacks 37, with each stack loaded on a pallet 38. The stacks, while shown in the drawings for reasons of clarity with an exaggerated clearance space thereinbetween, are arranged for transport on a vehicle with ends and sides snugly adjacent each other.

Dividing frame 21 into two compartments, and intermediate end walls 26, 27, is a bulkhead 41. The bulkhead is affixed to frame 21 of the vehicle, and extends upwardly to meet and support ceiling 31. The bulkhead divides the space between the inner faces of walls 27, 26 into compartments each of which has a length equal approximately to a whole number multiple of a side-to-side dimension of a package 36. Thus when the stacked packages or bags are arranged in a compartment with the stacks side-by-side extending along the length of the vehicle, bulkhead 41 and the end wall defining the compartment operate to hold the bags from shifting longitudinally of the vehicle and maintain the bags stacked in substantially upright rows.

Detachably secured along each side of the vehicle, and spanning the space between frame 21 and ceiling 31, is a set of stake members 51 each of which is separate from the others. Each is provided with two prongs or fingers 52 at its upper end, which fit into selectable sets of receiving wells 53, 53a formed in ceiling wall 31. The lower end of each stake member is secured to frame 21 by a slidable pin 56 which fits into one of mated receiving wells 57, 57a formed in the frame. Each stake member may be removed from a side of the vehicle by lifting pin 56 so that the pin clears its well 57. By providing plural wells spaced transversely of the vehicle, each stake member may be positioned in various selected positions. It will be noted that the construction contemplated enables the stake members readily to be freed from the sides of the vehicle even though the vehicle is positioned directly adjacent a loading platform.

The stake members are spaced at regular modules along each side of the vehicle. The modular spacing is related to a side-to-side dimension of packages or bags 36. Thus, as can be seen in Fig. 1, the spacing between stakes 51 is equal approximately to the width of a bag, and each stake member supports an end portion of a stack of bags intermediate its two sides.

A flexible curtain means is provided for covering each open side of the vehicle. This takes the form of a pair of curtains or sheet-like bodies 58, 59, made of canvas or similar material. An upper edge of each curtain is secured in an appropriate manner to a side edge of ceiling 31. The lower edge of each curtain is detachably securable to a side edge of frame 21. The vertical edges of the bodies are provided with slidable fasteners which define an air and moisture tight union.

Considering the means for attaching the lower edges of the curtains, each curtain carries along its lower edge a line 61 threaded through grommets spaced along the base of the curtain. To fasten a curtain in place, portions of a line along its length are pulled from the curtain where they pass over the inner face of the curtain, and these portions are slipped about the hooked ends of hooks or fastener members 62 carried by side members 24. After the slidable fastening devices are secured, the line is tied at one end to the frame, pulled at its other end to tension the line, and subsequently tied in a suitable manner at its other end to frame 21 to complete the attachment.

Extending longitudinally of the vehicle and carried by each curtain intermediate its upper and lower edges is an elongated bracing strip or rod 66. Each rod is mounted on a curtain so that the curtain along the length of the rod is maintained snugly against the rod. This may be done by securing the rod directly to the curtain throughout its length, or by fashioning a suitable sleeve portion in the curtain to hold the rod. The rod or bracing strip prevents a curtain from puffing out as a result of air currents produced by movement of the vehicle.

A pair of pull lines or cords 67 attached at one set of ends to the bracing strip of a curtain and reeved intermediate their ends over pulleys 68 mounted on the top of the vehicle enable the curtain to be raised preparatory to loading or unloading the vehicle. The pull lines run along the top of the vehicle and then downwardly over one end of the vehicle to a location within easy reach of a truck operator. Pulling downwardly of the free ends of a pair of lines or cords 67 for a curtain operates to raise the bracing strip connected thereto. The bracing strip travels from a position centrally of an open side of the vehicle, to a position located on top of the vehicle as shown in Fig. 2. After a curtain is raised, the lower edge of the curtain is approximately at the level of the edge of the ceiling 31.

Elongated flange portions 71, 72 (see Fig. 1) extend vertically along opposite side edges of the front and rear end walls, respectively. These flanges protrude a short distance outwardly to each side of the vehicle. The flanges cover the side edges of the curtains when the curtains are in their lowered position. The flanges aid the slidable fastening devices to prevent air from being scooped up by a curtain, and thus assist in inhibiting puffing of the curtains during movement of the vehicle.

Referring to Fig. 2, the vehicle of the invention may be unloaded as shown with the upper surface of frame 21 positioned approximately at the level of a loading platform. Removal of stakes 51 enables a fork lift tractor readily to maneuver onto frame 21 along the entire length of the vehicle. This eliminates the need of having to enter the vehicle through one constricted opening, and then to maneuver between the confining walls of a vehicle to reach a load.

It is claimed and desired to secure by Letters Patent:

1. A load carrying vehicle comprising an elongated flat-bed frame and mobile support therefor, a rigid upright end wall extending laterally across front and rear ends of said frame, respectively, each substantially coextensive with the width of the frame, a rigid ceiling joined to the upper ends of said end walls and spanning the space between the two, the side edges of said end walls, ceiling and frame along opposite sides of the vehicle defining the limits of elongated side opening extending substantially continuously along the length of the vehicle, plural stake members uprightly arranged spanning the space between said frame and ceiling spaced at intervals along each side of the frame, means detachably securing these stake members at one set of ends to said frame and at their other set of ends to said ceiling, and flexible curtain means for covering said side openings, said curtain means comprising a flexible sheet-like body secured along its upper edge to said ceiling and adapted to be lowered over the outside of said stake members with the stake members supporting the inside of the sheet-like body, the lower edge of said sheet-like body having means for detachably securing it along its length to said flat-bed frame, said sheet-like body having intermediate its upper and lower edges a bracing strip extending longitudinally of the vehicle, the two end walls of said vehicle having edge portions extending vertically substantially continuously along each side and projecting laterally outwardly from the vehicle beyond the plane of said curtain means when the latter is positioned to cover a side opening.

2. A load carrying vehicle construction comprising an elongated, rectangular flat-bed frame having an upright end wall rigidly attached to each end thereof and a ceiling connecting the upper ends of said ends walls, said frame, end walls and ceiling defining a rigid, rectangular structure with open sides, supports mounted on said frame for bracing a load carried by the vehicle from lateral shifting, said supports being removable from the frame, and flexible curtain means for covering the open sides, the latter comprising a flexible sheet-like body connected along an upper edge to said ceiling and having a lower edge connectable with said frame, said lower edge being connected by means of plural fasteners mounted on and spaced along the length of the flat-bed frame and an elongated line extending along the lower edge of the sheet-like body engageable with said fasteners, said sheet-like body covering a side laterally outwardly of said supports, said sheet-like body having an elongated bracing strip extending longitudinally of the vehicle carried by the body intermediate its upper and lower edges, and draw cords and pulley means for raising and lowering said sheet-like body, said draw cords being fastened at one set of ends to said bracing strip and trained intermediate their ends about said pulleys, said pulleys being mounted on said ceiling.

3. For a hauling vehicle having an elongated frame for supporting a load, open sides and a ceiling, a flexible sheet-like body connected to said ceiling depending down from said ceiling and covering an open side, said sheet-like body having an elongated bracing strip extending longitudinally of the vehicle carried by the body intermediate its upper and lower edges, means connecting lower edge portions of said sheet-like body to said frame, the latter means comprising plural fasteners mounted on and spaced along the length of said frame and an elongated line extending along said lower edge portions of said sheet-like body carried by the body and engageable at spaced locations with said fasteners, and draw cords and pulley means for raising and lowering said sheet-like body, said draw cords being fastened at one set of ends to said bracing strip and trained intermediate their ends about said pulleys, said pulleys being mounted on said ceiling.

4. A load carrying vehicle comprising an elongated, rectangular flat-bed frame having an upright end wall rigidly attached to each end thereof and a ceiling connecting the upper ends of said end walls, said frame, end walls and ceiling defining a rigid, rectangular structure with open sides, supports mounted on the frame for bracing a load carried in the structure from lateral shifting, said supports being removable from the frame, flexible curtain means for covering the open sides of the vehicle, the latter comprising a flexible, sheet-like body having a portion connected to the ceiling and having a lower edge connectable with the frame, said sheet-like body extending over a side laterally outwardly of the supports and having elongated bracing strip means extending longitudinally of the vehicle secured thereto intermediate the portion connected with the ceiling and its lower edge, draw cords connected to said bracing strip means, and pulleys mounted on the top side of the ceiling adjacent the center of the vehicle, said draw cords being trained intermediate their ends about said pulleys.

References Cited in the file of this patent

UNITED STATES PATENTS

| | | |
|---|---|---|
| 38,601 | Rankin | May 19, 1863 |
| 71,679 | Barlow | Dec. 3, 1867 |
| 1,729,555 | Sparshatt | Sept. 24, 1929 |
| 1,809,348 | Milner | June 9, 1931 |
| 2,061,673 | Robinson | Nov. 24, 1936 |
| 2,340,374 | George | Feb. 1, 1944 |
| 2,650,856 | Mashburn et al. | Sept. 1, 1953 |
| 2,715,040 | Rhoads | Aug. 9, 1955 |
| 2,820,667 | Benaroya et al. | Jan. 21, 1958 |

OTHER REFERENCES

Autobody and the Reconditioned Car, published June 1939. (Page 34 relied on.)